June 23, 1953  A. I. ROEDER  2,642,923
SAFETY CAR SEAT
Filed Feb. 11, 1949
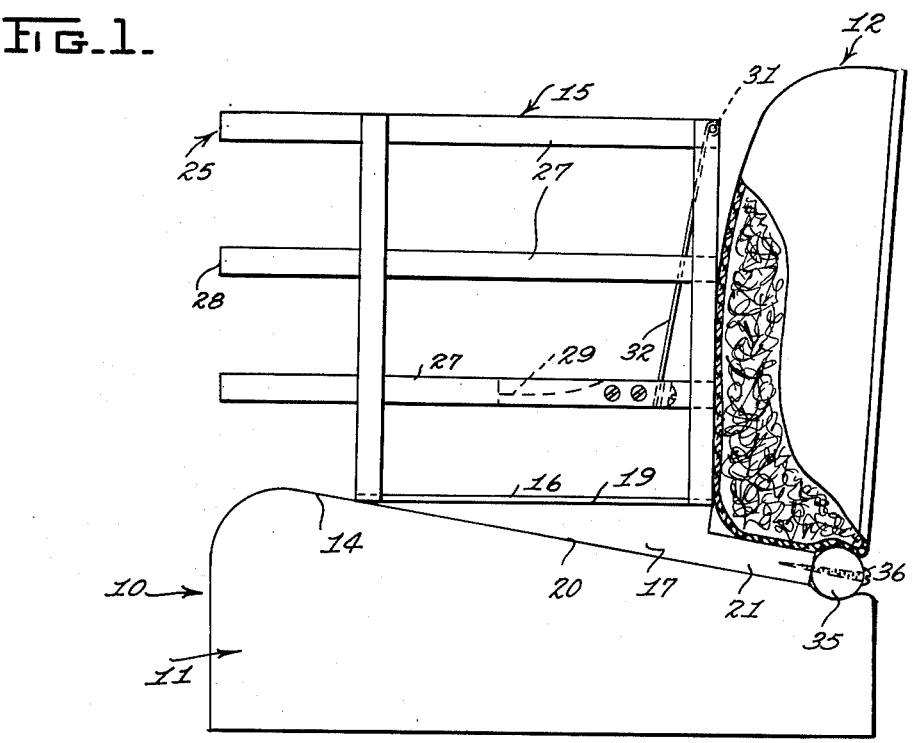
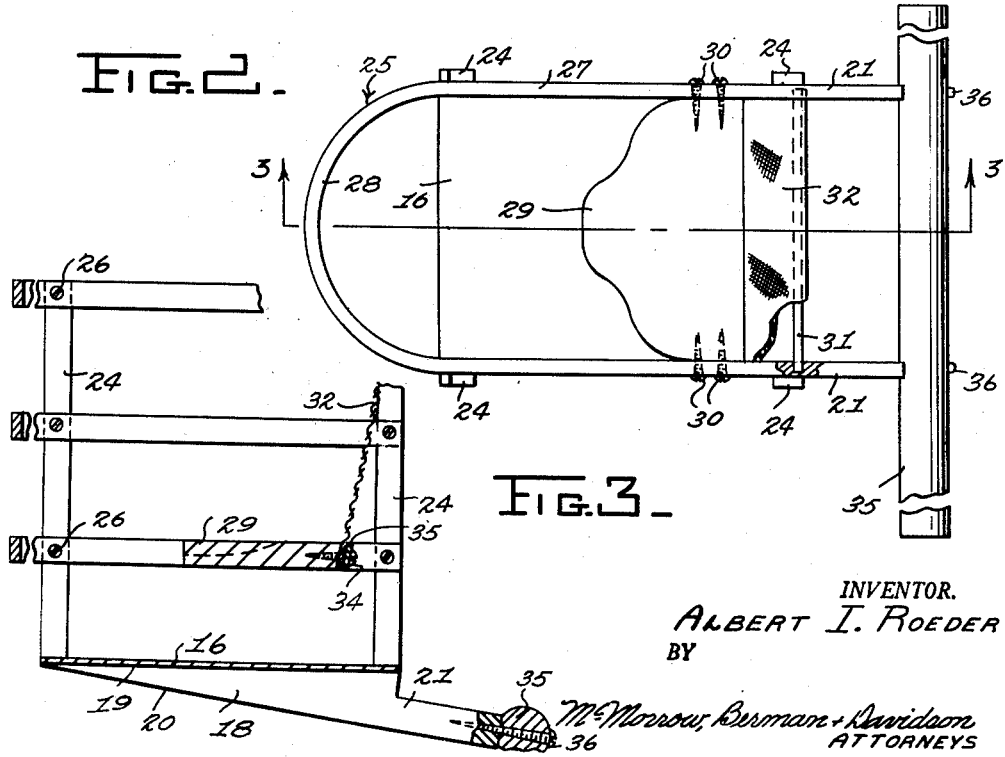
INVENTOR.
ALBERT I. ROEDER
BY
McMorrow, Berman & Davidson
ATTORNEYS Patented June 23, 1953

2,642,923

UNITED STATES PATENT OFFICE 2,642,923

SAFETY CAR SEAT

Albert I. Roeder, Celina, Ohio

Application February 11, 1949, Serial No. 75,761

3 Claims. (Cl. 155—11)

This invention relates to an auxiliary seat for attachment to the seat of an automobile, and more particularly to a child's seat for safely supporting a child in the front seat of an automobile.

It is an object of this invention to provide a safety car seat for a child to safely support a child on the seat of an automobile in such a manner that the child will have sufficient freedom of movement and yet be restrained from being thrown into the dashboard of the car in the case of a sudden stop. The seat is so constructed and arranged that the child may sit or stand and play without requiring the attention of the driver to prevent the child from being thrown from the seat in the event of a sudden stop or start.

Another object of this invention is to provide an improved fastening means for securing an auxiliary or jump seat to the upholstered seats of an automobile in such a manner that the seat may be securely wedged between the seat and back cushions to hold the jump seat against inadvertent sliding movement during the operation of the vehicle.

Still another object of this invention is to provide an auxiliary seat of the kind to be more particularly described hereinafter which may be easily secured in a selected position on the upholstered seat of the vehicle and is so constructed and arranged to prevent undue wear and tearing of the upholstery.

With the above and other objects in view, my invention consists in the arrangement, combination and details of construction disclosed in the drawings and specification, and then more particularly pointed out in the appended claims.

In the drawings:

Figure 1 is a side elevation of a safety seat constructed according to an embodiment of my invention, the rear seat cushion of the automobile being partially broken away and partly in section.

Figure 2 is a top plan view, partly broken away, of the safety seat removed from its engagement with the seat of the automobile.

Figure 3 is a longitudinal section taken on the line 3—3 of Figure 2.

Referring to the drawings, the numeral 10 designates generally the upholstered seat of an automobile, having an upholstered seat cushion 11 and an upholstered back cushion 12. In the conventional manner and arrangement of the seat and back cushions, the lower end of the back cushion 12 is disposed immediately above the rear edge of the seat cushion 11, as the seat cushion 11 is generally removable from a frame, not shown in the drawings, for supporting the seat. To provide for the comfort of the persons seated in the vehicle, the seat cushion 11 is formed with a downwardly and rearwardly inclined upper surface, noted by the numeral 14 in the drawings.

The auxiliary or safety jump seat 15, constructed according to an embodiment of my invention is adapted to be supported on the upper surface 14 of the seat cushion 11, adjacent the driver of the vehicle. The seat 15 is so constructed and arranged to support a child on a horizontal seat in such a manner that the child will be supported above the top of the seat cushion 14, and a guard rail is provided for restraining the child from being thrown about in the vehicle as a result of the sudden stopping or starting thereof.

The seat 15 is formed with a horizontal flat base plate 16 which may be formed of a sheet of plywood or other suitable material. The base plate 16 is substantially rectangular in configuration and is adapted to be supported above the seat cushion 11 in such a manner that the plane of the base plate 16 will be horizontal. A pair of base plate supporting members 17 and 18 are fixed on the bottom side edges of the base plate 16 for supporting the base plate on the top 14, of the seat cushion 11. The supporting members 17 and 18 are wedge-shaped or substantially triangular in configuration, having the point of the wedge disposed at the forward end of the base 16. The upper and lower edges 19 and 20 of the supporting members 17 and 18 are divergent rearwardly, as clearly noted in Figures 1 and 3 of the drawings. The top edge 19 of the supporting member 17 is terminated at the rear end of the base plate 16, while the lower edge 20 extends rearwardly beyond the rear end of the base plate 16, in continuation of the downwardly and rearwardly inclined forward portion of the edge 20.

An arm 21 is fixed to or formed on the rear end of the supporting members 17, the lower edge of the arm 21 being formed integral with and forming a continuation of the downwardly and rearwardly inclined lower edge 20 of the supporting member 17. The upper edge of the arm 21 is disposed substantially parallel to the lower edge 20, being downwardly offset from the rear edge of the base plate 16 at the rear end thereof.

Vertically extending corner posts 24 are fixed on the corners of the base plate 16 and extend upwardly therefrom. Guard rail members 25 are fixed on the corner posts 24 for engagement about the sides and forward edge of the base plate 16. The guard rails 25 are formed of side rail members, vertically spaced apart on the opposite sides of the base plate 16, and fixed to the corner posts 24 by fastening members 26, which may be of any suitable fastening means. The guard rails 25 include vertically spaced apart side rail members 27 which are terminated at the rear posts 24 and are connected together at their forward end by forwardly extending arcuate rail members 28. The forwardly extending rail members 28 are preferably formed integral with the side rail members 27 and are disposed in the same horizontal plane.

The jump seat 29 is supported above the base plate 16, by engagement with the lower guard rail member 27 between the front and rear vertical posts 24. The seat 29 is secured to the opposite side rail members 27 by bolts 30 or other suitable fastening means.

A transverse rod or bar 31 is fixed between the upper ends of the rear posts 24 for securing the top edges of the guard rail 25. A flexible back 32 is connected at its lower end to the rear edge of the seat 29, and at its upper end to the transverse bar 31. The lower end of the flexible back 32 is secured to the rear edge of the seat 29 by screws 34 engaging through a plate 35, while the upper end of the flexible member 32 may be wound about the transverse bar 31 and secured thereto by suitable fastening means.

For securing the seat 15 to the seat 10 of the automobile, I have provided a transverse anchor member 35 for engagement between the lower end of the back cushion 12 and the upper surface of the seat cushion 11 at the rear end thereof. The anchor member 35 is preferably formed of an elongated cylindrical bar or rod which is fixed to the rear ends of the arms 21, by screws 36 or other suitable fastening means. The rod 35 extends across the rear end of the seat 15, being secured to the rear ends of the arms 21 and extends outwardly beyond the side edges of the arms 21 and the sides of the seat 15. The anchor 35 is adapted to be seated below the rear edge of the bottom of the back cushion 12, and above the far rear end of the top portion of the seat cushion 11.

In the use and operation of the safety car seat 15, constructed according to an embodiment of my invention, one end of the anchor member 35 is initially engaged between the back cushion 12 and seat cushion 11. After one end of the anchor member 35 is pressed between the cushions, the remaining portion of the anchor member may be pivoted about the one end for disposing the entire length of the anchor member 35 between the cushions so that the rearmost corner posts 24 will abut the forward surface of the rear cushion 12. In this manner the forward edge of the base plate 16 will be disposed rearwardly of the forward edge of the seat cushion 11, and the seat 29 will be disposed in a horizontal position above the top portion 14 of the seat cushion 11. The forward edges of the guard members 25 will be disposed substantially in alignment with the forward edge of the seat cushion 11, substantially as shown in Figure 1 of the drawings.

I do not mean to confine myself to the exact details of construction herein disclosed, but claim all variations falling within the purview of the appended claims.

I claim:

1. A safety child's chair for attachment to an automobile seat having an upholstered back cushion and a seat cushion, comprising a base plate, a pair of downwardly and rearwardly extending supporting members fixed on the side edges of said base plate, an elongated anchor member fixed to the rear ends of said supporting members and extending outwardly from the side edges thereof, said anchor member being engageable between the lower end of the back cushion of the seat and said seat cushion, upwardly extending posts fixed on said base plate, vertically spaced apart horizontal side rail members fixed on said side posts on the opposite sides of said base, a seat fixed between the lowermost of said horizontal members, an upper connecting bar between the rearmost of said posts, a flexible seat back connected between said seat and said connecting bar, and forward horizontal rail members connecting the forward ends of said side rail members forwardly of said latter seat.

2. An auxiliary seat for attachment to the seat of an automobile having a seat and a back cushion comprising a base plate, a seat, guard rails about said seat, guard rail supports secured to and carried by said base plate, means securing said seat to said guard rail supports in substantial spaced parallelism with and spaced from said base plate, a pair of downwardly inclined rearwardly extending base plate supporting members fixed on said base plate, and an elongated anchor member fixed on the rear ends of said supporting members engageable between the lower end of said back cushion and said seat cushion.

3. A child's safety chair for attachment to an automobile seat having an upholstered back cushion and a seat cushion comprising a pair of laterally spaced downwardly and rearwardly extending supporting members, a base plate secured to said supporting members, an elongated anchor member fixed to and spanning the rear ends of said supporting members and extending outwardly from the side edges thereof, said anchor member being engageable between the lower end of the back cushion of the seat and said seat cushion, a seat, guard rails about said seat, guard rail supports secured to, carried by and projecting upwardly from said base plate, and means securing said seat relative to said guard rail supports above and in substantial parallelism with said base plate.

ALBERT I. ROEDER.

References Cited in the file of this patent

UNITED STATES PATENTS

| Number | Name | Date |
|---|---|---|
| D. 141,231 | Walker | May 15, 1945 |
| 1,216,287 | Corbin | Feb. 20, 1917 |
| 1,747,831 | Hess | Feb. 18, 1930 |
| 2,276,857 | Muller | Mar. 17, 1942 |
| 2,327,288 | Post | Aug. 17, 1943 |